H. J. RICHARD.
PLUG COCK.
APPLICATION FILED MAY 15, 1909.
948,075.
Patented Feb. 1, 1910.
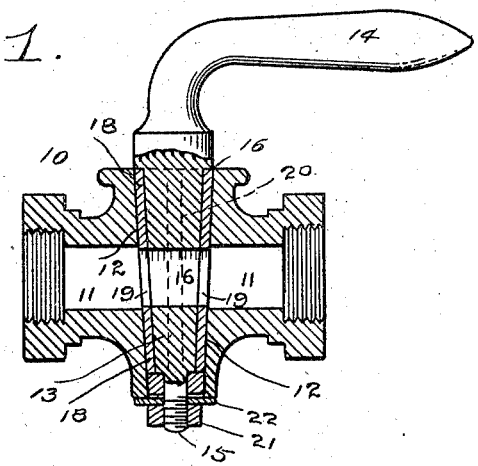
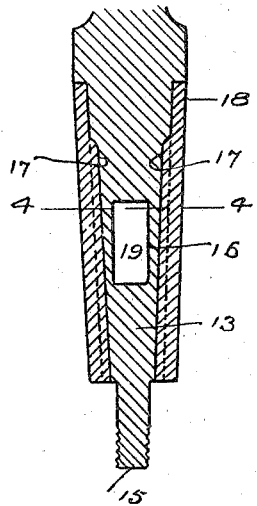
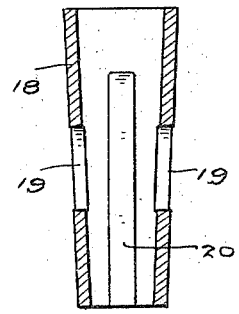
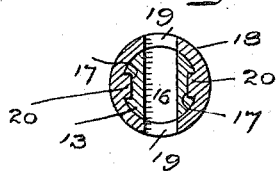
WITNESSES:
H. A. Lamb.
S. W. Atherton.
INVENTOR
Henry J. Richard
BY
A. M. Wooster
ATTORNEY

UNITED STATES PATENT OFFICE.

HENRY JOHN RICHARD, OF DANBURY, CONNECTICUT.

PLUG-COCK.

948,075.   Specification of Letters Patent.   Patented Feb. 1, 1910.

Application filed May 15, 1909. Serial No. 496,181.

*To all whom it may concern:*

Be it known that I, HENRY JOHN RICHARD, a citizen of the United States, residing at Danbury, county of Fairfield, State of Connecticut, have invented an Improvement in Plug-Cocks, of which the following is a specification.

This invention has for its object to provide a plug cock which shall be simple and inexpensive to produce, durable and easy to repair.

It is of course well understood that where plug cocks can be used they are much more desirable than compression cocks for the reasons that they are very much cheaper to produce and are quick acting, whereas compression cocks are relatively slow acting, several turns of a compression cock being necessary to shut off the flow or to produce a full flow, whereas a quarter turn or less of the lever of a plug cock will wholly shut off the flow or will open it to a full flow. The objection to plug cocks has been that they are not durable and are apt to leak, making repairs quickly necessary, and that the repairing of plug cocks has heretofore been relatively expensive. My present invention wholly overcomes these objections and enables me to produce a plug cock which shall be practically as inexpensive as the plug cocks now in use, shall be relatively durable and which may be easily and quickly repaired, making the cock as good as new at trifling expense and by any person who need not be skilled in the use of tools.

With these and other objects in view I have devised the novel plug cock of which the following description in connection with the accompanying drawing is a specification, reference characters being used to indicate the several parts.

Figure 1 is a longitudinal section of my novel plug cock in the open position as in use; Fig. 2 a longitudinal section on an enlarged scale of the plug detached, the line of the section being at right angles to the section line in Fig. 1; Fig. 3 a longitudinal section of the sleeve or shell detached; and Fig. 4 is a horizontal section of the plug and shell on the line 4—4 in Fig. 2.

10 denotes the body of a cock or faucet which may be of any ordinary or preferred style or configuration, the only requirements being a passage through it for water or other liquid, which is indicated by 11, and a tapering opening through it, indicated by 12, which intersects passage 11 at right angles thereto.

13 denotes the plug which lies in opening 12 and is provided with a handle or lever 14 for convenience in operation and with a threaded shank 15 at its lower end. The plug is provided with a transverse opening 16 through it which is adapted to register with passage 11, as in Fig. 1, to permit the passage of liquid or to be turned out of alinement therewith to shut off the flow. The plug is formed with an annular shoulder and a reduced body portion, said reduced portion being provided with one or more longitudinal grooves 17, two in the present instance.

The essential feature of novelty of my present structure is a detachable shell or sleeve 18, made of suitable wear-resisting material, which is carried by the plug and closely fits tapering opening 12. This shell may be made of metal, asbestos, vulcanized fiber, hard rubber, or any suitable wear-resisting material and is provided on opposite sides with openings 19 which register with opening 16 through the plug and with one or more internal ribs 20 which engage grooves 17 in the plug and lock the shell securely to the plug. The shell or sleeve 18 fits over the reduced portion of the plug with its end abutting the annular shoulder of the latter, whereby the exterior of said shell forms a practical continuation of the surface of said shoulder. Thus the diameter of the opening 16 does not have to be increased to receive the plug and its sleeve. The plug with the sleeve thereon is secured in the body in the usual manner by means of a nut 21 engaging the threaded shank, one or more washers 22 being ordinarily interposed between the nut and the end of the body to permit the plug to be tightened up in the tapering opening to prevent leakage. The shell in practice being of a wear-resisting material may ordinarily be used for a long time without leakage. Should repairs become necessary, however, the plug may be readily removed by turning off the nut, the shell may be slipped off and a new one placed thereon, and then the plug with the new shell thereon is replaced and tightened up by means of the nut as before. This operation may be readily performed by anyone, as the only tool required is a wrench to remove and tighten up the nut and at trifling expense as the shells cost very little and may be retailed for a few cents.

Having thus described my invention I claim:—

A plug cock comprising a body having a passage through it and a transversely arranged tapering opening intersecting said passage, a plug in said opening provided with a reduced portion forming an annular shoulder, said reduced portion being provided with longitudinal recesses, and a threaded stem projecting through the bottom of said opening, and a removable shell fitting on said reduced portion and provided with internal ribs engaging said recesses, one end of said shell abutting said shoulder, a washer on said stem engaging the other end of said shell, and means engaging the projecting end of said stem for holding said plug in position within said body.

In testimony whereof I affix my signature in presence of two witnesses.

HENRY JOHN RICHARD.

Witnesses:
 HENRY L. RYDER,
 JOHN M. BELDEN.